April 7, 1942. F. E. WOLCOTT 2,278,754
COFFEE MAKER
Filed June 17, 1938
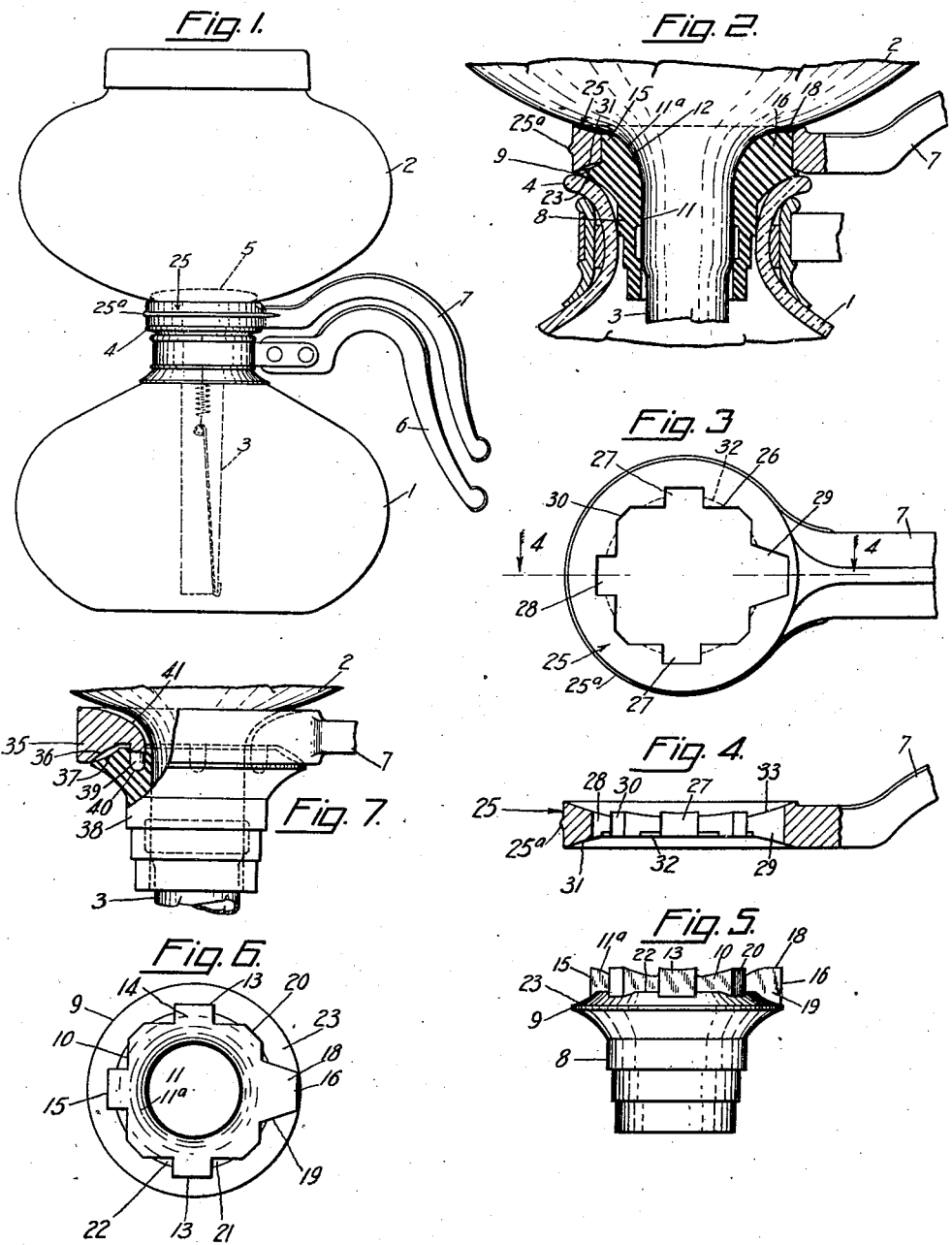
INVENTOR
Frank E. Wolcott
By
ATTORNEY Patented Apr. 7, 1942

2,278,754

UNITED STATES PATENT OFFICE 2,278,754

COFFEE MAKER

Frank E. Wolcott, West Hartford, Conn., assignor to The Silex Company, a corporation of Connecticut Application June 17, 1938, Serial No. 214,278

1 Claim. (Cl. 53—3)

My invention relates to coffee makers.

It has heretofore been proposed to provide the upper bowls of vacuum type coffee makers with grasping means for carrying the bowls or enabling the seal on the upper bowl stem to be moved relative to the neck of the lower bowl in such manner as to effect sealing after the insertion of the upper bowl and before infusion, or to break the seal after infusion and preparatory to removing the upper bowl. Thus, for example, in my prior Patent No. 1,967,986, I provided on the upper end of the seal an enlarged flange adapted to be grasped between the thumb and forefinger, while in other constructions it has been proposed to provide a vertical handle having no connection with the seal and connected to the upper bowl both above and below the bowl body. Neither of these constructions have, however, been satisfactory, the flange on the seal requiring considerable care to avoid contact with the hot bowl and prevent breakage in handling the bowl when carried thereby, while the connection of the handle above and below the bowl, requires a special and unattractive construction of bowl and handle, and in addition to unduly increasing the expense, also requires a connection to the top of the bowl which places the glass of the upper bowl under objectionable strain.

My invention has among its objects to provide an improved handle means for an upper bowl whereby the above objections are overcome. Further objects of my invention are to provide an improved upper bowl handle structure projecting laterally in an improved manner making it safely and conveniently accessible, and such a handle connected in an improved location between the body and stem of the upper bowl and having improved connections cooperating in an improved manner with both the upper bowl and the seal. A still further object of my invention is to provide such an improved cooperating handle structure for the upper bowl adapted during use of the coffee maker to cooperate in a new and improved manner with the handle of the lower bowl. Still further objects of my invention are to provide improved connecting means between such a handle and the upper bowl, and such means whereby, while obtaining the above advantages, it is also made possible to connect the same through the medium of an improved form of seal adapted to cooperate with the handle in an improved manner. These and other objects and advantages of my improvement will, however, hereinafter more fully appear.

In the accompanying drawing, I have shown for purposes of illustration certain embodiments which my invention may assume in practice.

In the drawing—

Figure 1 is a side elevation of a vacuum type coffee maker equipped with one form of my improvement, the upper bowl being shown in assembled relation in the lower bowl;

Fig. 2 is an enlarged detail vertical sectional view of the structure at the neck of the lower bowl, the latter being shown in section while the stem of the upper bowl is shown in side elevation;

Fig. 3 is a plan view of the end of the handle carrying the connections to the seal;

Fig. 4 is a section on line 4—4 of Figure 3;

Fig. 5 is a side elevation of the seal showing the structure at the upper end thereof cooperating with the handle structure shown in Figures 3 and 4;

Fig. 6 is a top plan view of the seal, and

Fig. 7 is a view similar to Figure 2 but showing a modified construction, the lower bowl also being omitted and only portions of the handle and seal being shown in section.

Referring to the construction shown in Figures 1-6, it will be noted that I have therein illustrated a vacuum type coffee maker comprising lower and upper bowls 1 and 2 and having a stem 3 on the upper bowl extending down through the neck 4 of the lower bowl; a usual strainer 5 being operatively associated with this stem and the latter being sealed in the neck 4 in a well known manner, while lower bowl 1 has a usual handle 6 on its neck and the upper bowl 2 has an improved handle 7 connected in an improved manner to the upper bowl at a point just above the neck 4, as hereinafter described.

Referring more particularly to the improved upper bowl handle 7, it will be noted that, as shown in Figure 1, this handle 7 extends laterally and downwardly generally similarly to the handle 6 so that it may be readily grasped without danger of burning the hand. Further, it overlies the handle 6 and is adapted to be disposed over the latter as shown, so that both may be grasped in the same hand, while also being adapted to be disposed angularly relative to the handle 6 at any desired angle. Thus, the lower bowl may be positioned by grasping the handle 6 while the handle 7 is grasped in the other hand, as during insertion or removal of the upper bowl or tightening or breaking the seal between the bowls. This handle 7 is herein also connected to the stem 3 through a seal 8 which is carried on that stem and forms a seal between the stem 3 and the neck 4 of the lower bowl. As shown, the structure of the seal 8 below an upper flange 9 thereon is of a well-known externally stepped and internally grooved construction, such, for example, as shown in my prior patents Nos. 1,967,984 and 2,015,983. However, herein it will be noted that above this flange 9 the seal is of an improved construction presenting an upper improved connecting portion adapted to be connected to the handle 7 in an improved manner, while the handle 7 is also provided on its inner end with an improved connecting structure adapted to cooperate with this new upper portion on the seal.

Referring first to the improved upper connecting portion on the seal 8, shown in Figures 5 and 6, it will be noted that, while not limited thereto, this portion is preferably formed of the same soft rubber material of which the remainder of the seal 8 is formed. As shown, it also includes a generally rectangular portion 10 formed on the top of the seal and projecting upward around the upper end of the usual axial stem receiving aperture 11 in the seal. Here it will also be noted that this aperture 11 is provided at its top with a bell-mouth 11a adapted to conform to and fit snugly upon, a corresponding portion 12 on the upper bowl 2, which is located at the junction between the stem 3 and the upper bowl 2. Moreover, it will be observed that the portion 10 is provided on two opposite sides thereof with oppositely disposed and laterally extending, generally rectangular projections 13, which are centrally located on these opposite sides of the portion 10. These projections 13, as hereinafter described, form keys which are adapted to cooperate with corresponding portions on the handle, while it will also be noted that each of these portions 13 has its upper surface 14 disposed in and forming a part of the bell mouth 11a which engages and fits snugly against the curved adjacent portion 12 of the bottom the bowl 2. Disposed at right angles to these projections 13, and opposite each other, are also other cooperating projections or keys 15 and 16 likewise interlocking with the handle as hereinafter described. Of these, the projection 15 generally corresponds to a projection 13 and is provided with a similar upper surface 14. The projection 16, however, is substantially wider than any of the other projections and is provided with both a like surface 14 and a flat outer portion 18. This projection or key 16 also extends out radially of the seal considerably farther than the portions 13 and 15, while it is herein also further different as regards its sides, being connected to the body of the portion 10 by like sloping and vertically disposed sides 19. Here attention is also directed to the fact that to provide additional surfaces cooperating with the handle as hereinafter described, the corners of the portion 10 are cut or slabbed off to provide additional abutments 20, and that, between the latter and the adjacent projections, indentations 21 are thus formed on the seal 8 at each side of each projection or key. Note further that the bases 22 of these indentations 21 are flat and have curved outer edges struck about the axis of the seal 8 and disposed above the sloping top surface 23 of the flange 9. As shown, the projections 13 and 15 project radially slightly beyond these edges, while the projection 16, which extends out farther than the projections 13 and 15, extends out substantially to the periphery of the flange 9.

The improved cooperating connecting portion on the handle 7 is generally indicated at 25 and herein formed integral with the handle 7. As shown, this portion 25 is circular in outside outline, and is provided with a like peripheral strengthening rib 25a, this last being desirable when, as in the preferred construction, the portion 25 is formed of insulating material, such, for example, as the same insulating composition as that from which the handle 7 is molded. Attention here is also directed to the fact that a generally rectangular opening 26 is provided in this portion 25 which conforms in shape to the cross section of the improved upper end of the seal 8, heretofore described. This opening 26 is herein provided with cut-out portions 27 adapted to receive the two projections 13, a cut out portion 28 adapted to receive the projection 15 and a cut out portion 29 adapted to receive the projection 16. As shown, the corners of the opening 26 are also sloping, as shown at 30, to engage the cut-off corners 20 on the upper end of the seal. Herein, the under surface of the portion 25 around the opening 26 is also dished or cut away, as shown at 31, to permit it to fit over the portion 23 on the flange 9, while socket portions 32 are also provided which are adapted to receive the bases 22 on the upper end of the seal 8. It will, moreover, be observed that the top of the portion 25 is also curved or dished, as shown at 33, to permit it to underlie the curved portion of the bottom of the bowl 2 adjacent its junction with the stem 3, while enabling the surface 11a of the portion 10 to extend slightly beyond the upper surface 33 of the portion 25 and into contact with the curved bottom of the bowl 2. The periphery of the dished portion 33 on the upper surface of the portion 25 extends into or substantially into, contact with the bottom of the bowl, but preferably the remainder of the dished portion 33 is spaced below the bowl in such manner as not to contact therewith and thereby reduce heat conduction to said handle.

In the use of my improved construction, with the seal 8 and handle 7 interconnected by the interlocking portions on each, as shown in Figure 2, it will be evident that a very effective turning connection is provided between the handle 7 and the seal 8. By this construction, in effect, a multiplicity of keys is provided and the latter are spaced around the axis of the stem and seal. Thus, these keys provide such radially located points of contact as effectually to prevent the portion 25 riding over the cooperating interlocked portions on the top of the seal 8, which would otherwise occur, due to the flexibility of the rubber from which the seal is formed. As a result, it will be evident that when the handle 7 is turned, the seal 8 will surely turn with the same. Moreover, due to the frictional grip between the seal 8 and the stem 3, it will be evident that the upper bowl 2 and seal 8 will be moved with the handle 7 and relative to the neck 4 of the lower bowl 1. Thus, by merely moving the handle 7, through the leverage obtained therefrom, it is made possible very readily to release the two bowls 1 and 2 by breaking the seal, preferably through a rotative movement of the handle 7. Further, when it is desired to connect the seal, as after the bowl 2 has been placed in the bowl 1 and before infusion, it will also be evident that a sealing action of the seal 8 may be readily brought about by like movement of the handle 7. Due to the connection of this handle to the upper bowl and the disposition of the handle relative to the latter, it will also be evident that the upper bowl can be very readily and conveniently carried or held without danger of burning the user or of dropping the bowl. During carrying the complete coffee maker, it will also be noted that the handles 6 and 7 may be disposed one above the other in such manner that the two handles may be readily and comfortably grasped in the same hand, thereby effectually preventing tilting or loss of the upper bowl 2 without requiring the use of the other hand. Obviously, while the handles 6 and 7 may be disposed one above another during carrying, the handle 7 may be moved angularly out of registry with the handle 6 or disposed at any desired angle relative thereto during use, the bowl I then being readily held in any desired position by grasping its handle 6, while the bowl 2 is moved relative thereto by movement of the handle 7.

Among further results of my improved construction, it wil be observed that, at the same time that the parts are thus securely connected and readily and conveniently operated as described, it is also possible for the handle 7 to be separated from the seal 8, whenever desired. Further, the assembly of the parts on the stem 3 is facilitated, and it will be noted that the handle 7 is securely positioned by the seal 8, while the transmission of heat to the grasping portion of the handle is also minimized. Attention is further directed to the exceedingly compact nesting of the bowls I and 2, as well as to the support for the bottom of the bowl 2 around the stem 3 thereon afforded by the portion IIa on the seal 8. Also, the handle 7 is so disposed relative to the bowl 2 that, irrespective of variations in the shape of the bottom of the latter, there is no danger that an operator grasping the outer end of the handle 7 will be burned by contact with this bowl. At the same time that a very effective upper bowl handle connection is provided, it will also be observed that the appearance of the coffee maker is improved; the connections for the upper bowl handle, for example, being of substantially the diameter of the neck of the lower bowl and eliminating all need for the under flange of my prior construction.

These and other advantages of my improved construction will, however, be clearly apparent to those skilled in the art.

In Figure 7 I have illustrated another form which my improved construction may assume in practice while continuing to have the handle 7 connected to the bowl 2 through the medium of the seal 8 in the same general manner heretofore described. Here, it will be observed that the handle 7 is provided with a connecting portion 35 having a cut away portion 36 in its bottom adapted to receive the top 37 of a seal 38 of the general form shown in my Patent No. 2,015,983, i. e., without the projections heretofore described. However, in this construction, it will be observed that the connecting portion 35 on the handle is provided with a series of spaced depending projections 39 and that the seal is provided with corresponding vertical openings 40 in its top and so disposed that these openings 40 will register with and receive the projections 39 on the portion 35.

While I have herein specifically described certain forms of my invention, it will be understood that these forms have been chosen for purposes of illustration, and that the invention may be embodied in other forms without departing from its spirit or the scope of the appended claim.

What I claim as new and desire to secure by Letters Patent is:

For a coffee maker comprising an upper bowl, a handle, a seal, said handle having an annular connecting portion provided with an axial aperture adapted to receive the upper end of a seal on the stem of said bowl, and radially located key receiving portions forming the inner wall of said aperture and disposed around said aperture and adapted to receive the top of said seal, said annular portion, key receiving portion and seal being dished on one face thereof to conform with the bottom of said upper bowl for permitting the said connecting portion to be retained in locked engagement with said seal by contact against the bottom of said upper bowl.

FRANK E. WOLCOTT.